(12) United States Patent
Paradiso et al.

(10) Patent No.: US 7,109,865 B2
(45) Date of Patent: Sep. 19, 2006

(54) TAG INTERROGATION WITH OBSERVABLE RESPONSE SIGNAL

(75) Inventors: Joseph A. Paradiso, Medford, MA (US); Hongshen Ma, Cambridge, MA (US); Andrew Benjamin Lippman, Salem, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 135 days.

(21) Appl. No.: 10/255,557

(22) Filed: Sep. 26, 2002

(65) Prior Publication Data

US 2004/0061612 A1 Apr. 1, 2004

(51) Int. Cl.
*G08B 13/14* (2006.01)
(52) U.S. Cl. .............................. 340/572.1; 340/572.3; 340/572.4; 340/571; 340/573.1; 340/539.1; 340/539.13; 340/825.69
(58) Field of Classification Search ............. 340/572.1, 340/571, 572.3, 531, 539, 568.1, 825.35, 340/573.1, 825.49, 825.54, 572.8, 573.4, 340/539.1, 539.13, 825.69, 825.72, 572.4
See application file for complete search history.

(56) References Cited

U.S. PATENT DOCUMENTS

| | | | | |
|---|---|---|---|---|
| 5,387,993 A * | 2/1995 | Heller et al. | ................. | 398/151 |
| 5,455,409 A * | 10/1995 | Smith et al. | ................. | 235/385 |
| 5,689,238 A * | 11/1997 | Cannon et al. | .......... | 340/572.1 |
| 5,936,527 A * | 8/1999 | Isaacman et al. | ........ | 340/572.1 |
| 5,959,531 A * | 9/1999 | Gallagher et al. | ........ | 340/572.1 |
| 6,154,139 A * | 11/2000 | Heller | ...................... | 340/573.4 |
| 6,297,737 B1 * | 10/2001 | Irvin | .......................... | 340/571 |
| 6,446,865 B1 * | 9/2002 | Holt et al. | ................. | 235/382 |
| 6,677,852 B1 * | 1/2004 | Landt | ........................ | 340/10.1 |

OTHER PUBLICATIONS

Want et al. "The Active Badge Location System", ACM Transactions on Information Systems, vol. 10, No. 1, Jan. 1992, pp. 91-102.

* cited by examiner

*Primary Examiner*—Hung Nguyen

(57) ABSTRACT

An identification tag identifies a unique item from among a plurality of items with a similar appearance. Tagged items are searched by scanning the items with an interrogation signal. The tag emits an observable signal to indicate when it receives an identification that matches the identification contained in the tag. When the reader's interrogation is not present, the tag either sleeps at a very low power level or is passively unpowered.

33 Claims, 4 Drawing Sheets

TAG INTERROGATION WITH OBSERVABLE RESPONSE SIGNAL

FIELD OF THE INVENTION

The invention relates to the field of object identification and location and, in particular, to locating a specific object from among a plurality of objects that have similar appearances.

BACKGROUND OF THE INVENTION

Identification systems are used to locate both animate and inanimate objects. For example, identification systems can locate vehicles carrying interstate freight, employees within a hospital, and items in retail establishments to guard against theft. Identification systems may also be used to locate sources of information. However, in some ways, the difficulty of locating unique information has increased with modern advances in information technology and related storage devices. Because many forms of modern information storage media have a nondescript appearance, there is an increased need to locate specific files and data from among many objects that have similar, or even identical, appearances. For example, a collection of compact discs (CDs) that contain stored data (e.g., digital photographs) may be searched in order to locate the specific CD that contains a particular digital photograph being sought. If the contents of each CD are clearly indicated on the CD or the CD storage case, the search will likely be successful, but it will also be tedious because each CD must be inspected until the photograph is found. If the CD contents are not identified, the search will become even more lengthy because each CD must be inserted into a computer where the contents of the CD may be read. Many other forms of information storage media present similar difficulties in locating specific stored information. As a result, the search for the media containing a specific document or file may become painstakingly tedious because the field of search is large.

The preceding example is directed to a single type of information storage medium, e.g., CDs. However, because more than one type of information storage medium may be suitable for storing a particular type of data, the search for a unique item from among multiple different types of items (e.g., digital audio tapes, floppy disks, DVDs, and miniDVDs) may be required. This multi-medium search presents many of the previously described challenges, particularly when the searcher is not sure which medium contains the unique item that is sought.

These challenges are not limited only to electronic storage media, and information storage media generally. For example, the collection of anonymous boxes and crates found in any warehouse are also difficult to distinguish from one another, and determination of their contents is generally difficult without a close individual investigation.

Many of today's identification systems are based on "tags" that may be read by an external (and typically wireless) reader. Generally, identification tags fall into one of two categories. Active power tags, i.e., those tags that include a power supply, comprise the first category. Passive identification tags, which are powered by a tag sensing system, comprise the second category. For example, the tag circuits of some passive tagging systems are powered via a magnetic, electrostatic or RF field broadcast by a tag reader. Active tags consume a considerable amount of power in order to receive the tag identification signal, in part because of the linear amplifiers typically required in the receivers of these tags. Because, generally, a battery supplies the power for active tags, these tags have relatively short operational lives before either the battery must be replaced or the tag discarded.

At the same time, while tags offer a convenient means of uniquely identifying items, tag-reading systems do not readily lend themselves to discrimination among items having a similar appearance. That is, the reader cannot directly communicate which one of a collection of items is the one sought. If items must be scanned individually until the desired one is located, then tag identification systems will offer few benefits, in terms of item discrimination, over manual inspection.

SUMMARY OF THE INVENTION

The present invention facilitates discrimination among similar items by causing the item itself, or a tag associated therewith, to produce—directly or indirectly—an observable signal. Thus, in response to a signal that encodes the identity of the desired item, that item will effectively announce itself in a manner that facilitates its ready location. In one embodiment, an improved approach to locating items is provided by identification tags that respond to an interrogation signal only when the signal containing that tag's unique identification is received. That response, again, is an observable signal rather than one detectable only by the tag reader. Further advantages are achieved when the tag is substantially passive, operating in a very low-power "sleep" mode until the signal uniquely associated with that tag is detected.

In one aspect, therefore, the invention provides a method of discriminating among similar items by associating each item with a device responsive to a unique stimulus, and exposing the items to a stimulus corresponding to a selected item such that the corresponding item, but no other items, impart an observable signal. In one embodiment, each device responds to a differently modulated light beam. In a version of this embodiment, the light beam is modulated by an AM frequency, and each device responds to a modulation by a different AM frequency.

In another aspect of the invention, a transmitter transmits an interrogation signal that includes an identification associated with a selected tag. Each of a plurality of tags contains a tag identification uniquely identifying the tag, and is responsive to an interrogation signal when the transmitted identification matches the tag identification. A transducer is associated with each tag and imparts an observable signal upon response of the tag to the interrogation signal. In one embodiment, the transmitter is integrated in a wireless handheld device. In another embodiment, the observable signal is directly observable in the vicinity of the tag.

In a further aspect, an identification tag is associated with a specific object having a generic appearance. The tag includes a receiver for receiving an interrogation signal that includes an object identification, a memory for storing a tag identification that uniquely identifies the tag, and a device for emitting an observable signal in response to the interrogation signal when the object identification matches the tag identification. In one embodiment, the tag includes a power source that supplies an operating current for the tag. In a version of any of these embodiments, the tag operates in a very low power sleep mode when not processing the interrogation signal. In a particular, a power source supplies an operating current of less than or equal to 500 nanoamps when the tag is in a sleep mode. In this case, the tag "wakes up" from its very low power sleep mode upon detecting the carrier frequency of the interrogation signal, then responds upon finding a particular modulated transmit code. In still another embodiment, the observable signal is audible. In a further embodiment, the observable signal is visible.

DETAILED DESCRIPTION

Figure 1:
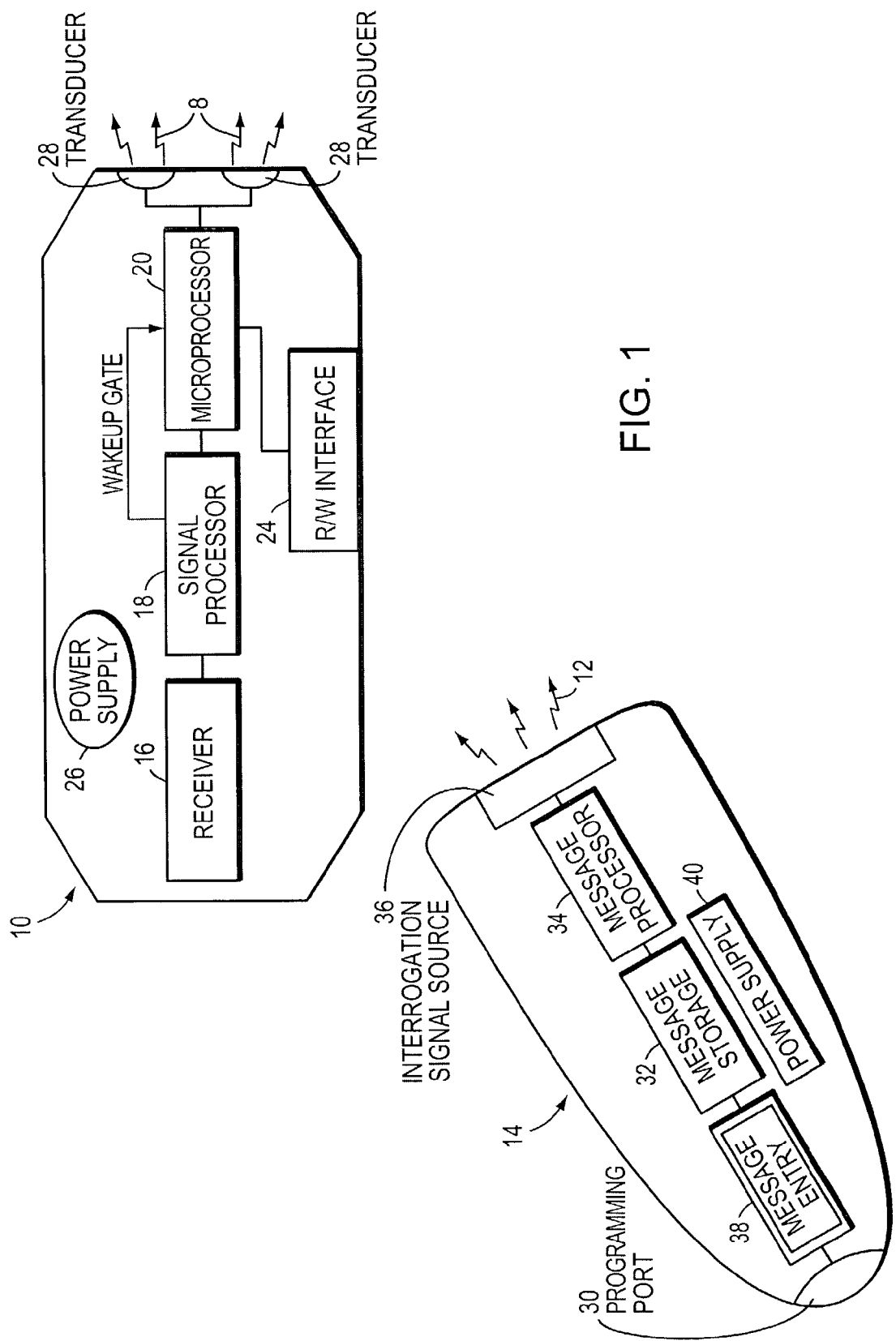
FIG. 1 is a block diagram of an object-locating system in accordance with the invention.

FIG. 1 provides a general overview of an object-locating system whereby a single item can be quickly and precisely located from among a plurality of similar items. A searcher can locate the specific item sought by identifying the source of an observable signal 8 emitted by an identification tag 10. In one embodiment, the identification tag 10 emits the observable signal 8 when it receives a unique interrogation signal 12. As is described herein, the search protocol provided by the system allows an area to be rapidly scanned without the need to individually inspect each item.

Each identification tag 10 is associated with a unique object. In one embodiment, the identification tag 10 is affixed to or otherwise associated with the object. In another embodiment, the tag 10 is affixed to or otherwise associated with an item in close proximity to the object (e.g., a cartridge, a storage container, a physical location, an article of clothing, etc.). The system also includes a transmitter 14 that transmits the interrogation signal 12 in order to locate the object being sought. The interrogation signal 12 may be any signal such as an RF signal, an optical signal (e.g., a light beam), a microwave signal and the like so long as the signal can provide wireless transmission of an object identification. The object identification is information that uniquely identifies one of the tagged items.

In one embodiment, the tag 10 includes a receiver 16, a signal processor 18, a microprocessor 20, a read/write interface 24, a power supply 26, and one or more transducers 28. The receiver 16 may comprise any device such as an antenna, a photodetector, a rectenna and the like provided it is capable of wireless reception of the interrogation signal 12. The received signal is processed by the signal processor 18, which may comprise one or more digital and/or analog electronic components. For example, the signal processor 18 may provide filtering and signal conditioning to facilitate comparison of the object identification contained in the interrogation signal 12 with the tag identification contained in a memory of microprocessor 20. Alternatively, the tag identification may be stored in the media itself. For example, the tag identification may be written onto a protected section of an information storage disk, e.g., a CD.

In one version, the tag identification is stored within the tag 10 at the time it is manufactured. In another version, the tag identification is written to the microprocessor 20 at a later point in time, for example, when the system is configured for a specific application. In one embodiment, the tag 10 includes a read/write interface 24 that facilitates the writing of the tag identification to the tag 10 and subsequent alteration thereof. In another embodiment, the read/write interface 24 allows the tag identification to be read by another device. It should be understood, however, the read/write interface 24 is not required (e.g., where the tag identification is provided at the time of manufacture or system initialization). In either case, the tag 10 may include an external surface where the stored tag identification is also reproduced visibly for easy reference. The ability to read and write the tag identification to or from memory located in the tag 10 is particularly advantageous when the tag 10 is associated with an object of electronic storage media. For example, at the time information is stored in a unique media object, the media's object identification can be automatically associated with the tag 10 via read/write interface 24, thereby identifying the media item where the information is stored. In one version of this embodiment, the read/write interface 24 facilitates physical connection to, e.g., the serial port of a personal computer. Alternatively, the interface 24 may utilize wireless, non-contact communication. For example, the interface 24 may be an optical signal path or an RF signal path.

Regardless of whether a read/write interface 24 is used, each unique object is associated with a unique tag identification. This association creates an object identification that may later be used to identify the object from among a plurality of similar items. Additionally, to facilitate future searches, it is advantageous to record an object-identification/tag-identification association in a manner that allows for its later retrieval. In one embodiment, the association is recorded in a computer database. In a version of this embodiment, the association is automatically recorded when information is stored in an object of electronic storage media.

In one embodiment, the tag 10 is also equipped with a power supply 26 that supplies power to the tag's electronic components. In one embodiment, the power supply 26 is a battery. In a version of this embodiment, the power supply 26 is a lithium coin cell. As described in more detail herein, in one embodiment, the tag 10 operates in a substantially passive mode despite the fact that the tag 10 includes a power supply 26. In particular, the identification tag 10 operates in a low-power shutdown mode until the interrogation signal 12 is detected. In one embodiment, substantially passive operation is achieved, in part, because the tag 10 does not include a linear amplifier. Instead, the tag includes a filter to isolate the carrier frequency of interrogation, and a very low power comparator to detect the frequency and wake up the tag's microprocessor 20. The tag 10 desirably draws less than 500 nanoamps when not processing an interrogation signal 12. Indeed, the tag 10 may draw less than 300 nanoamps or even less than 100 nanoamps.

In one embodiment, the tag 10 is comprised of a single integrated circuit. However, the tag 10 need not be a single unit and it is shown in this manner only for reference. Thus, various of the identified system elements may be moved outside the tag 10 provided that the functional objectives are achieved. For example, the transducers 28 may be located in a storage rack adjacent the tagged item.

In one embodiment, the transmitter 14 of FIG. 1 includes a programming port 30, a message storage device 32, a message processor 34, an interrogation signal source 36, a message entry device 38, and a power supply 40. The message storage device 32 stores one or more object identification messages. Additionally, to ease the retrieval of object identification messages, the message storage device 32 (or an external computer in communication with message storage device 32) may also store one or more item/message associations in a database. These associations allow a user to simply select the item to be located, and the database then selects the corresponding object identification message. In one embodiment, the transmitter 14 includes a separate memory for storing these item/message associations. The message storage device 32, which may be a microcontroller incorporated in a circuit card, supplies the object identification message to the message processor 34, which embeds this in an output signal in a detectable fashion (e.g., by modulating the signal). For example, the object identification message may be embedded in either an AM or a FM signal. With either signal type, the signal includes a carrier frequency with a signal characteristic altered in a manner that encodes the message in the signal. Additionally, regardless of the modulation scheme employed, the message is encoded such that when interrogation signal 12 is demodulated by tag 10, the message includes the object identification. In a version of the AM embodiment, the message processor 34 comprises an amplitude-modulating driver, e.g., a MOSFET switch, which acts on the message received from the message storage device 32.

The interrogation signal source 36 receives the signal from the message processor 34 and transmits it in a format that is compatible with the tag's receiver 16, e.g., an optical signal or a RF signal. To encode the message, message processor 34 causes the interrogation signal source 36 to alter the output intensity or frequency of the interrogation signal 12. For example, in the optical embodiment, the intensity of the resulting interrogation signal 12 is altered in response to the modulated signal. In one version this embodiment, the message processor 34 provides an amplitude-modulated 2 kHz signal that is converted to an optical signal by the interrogation signal source 36. The interrogation signal source 36 may be a laser diode. In another version, the laser diode is a 5 milliwatt red diode laser similar to laser diodes employed in laser pointers. In still another version of this embodiment, the interrogation signal source 36 is an array of bright LEDs. The interrogation signal source 36 may include a lens, e.g., a defocusing lens. The ability to defocus an optical interrogation signal 12 is advantageous because it improves the system's safety and broadens the search area. Alternatively, the transmitter 14 may include an adjustable lens capable of being adjusted to change the area that is reached by the interrogation signal 12. The range of the transmitter 14 is desirably at least three meters.

Optical interrogation is advantageous, generally, because it provides visual confirmation of the area that is being searched at any moment. Thus, optical interrogation increases the speed and efficiency of the search. Additionally, optical interrogation is compatible with common experience (e.g., scanning a darkened room with a flashlight) so its operation is natural and familiar.

The programming port 30 and the message entry device 38 each provide independent (or alternative) means of entering one or more object identifications into the transmitter 14. In one version, the programming port 30 is a USB port that facilitates the serial transmission of information from a computer or other electronic storage device to the transmitter 14. Alternatively, in another version, the programming port 30 is a receiver for receiving object identification information that is transmitted to the transmitter 14 via a wireless LAN (e.g., IEEE standard 802.11). In this way, a database of objects and identifiers associated therewith may be stored on an external computer. When the user selects an item of interest, the database supplies the corresponding identifier to the message entry device 38 via the programming port 30. The user therefore need not maintain any awareness of object identifiers; he or she simply selects the desired item. (As previously described, the database may alternatively be included in memory located within the tag 10, and the item selection may be entered directly into the tag 10 via the programming port 30.)

Alternatively, the user may identify the desired item directly, using the message entry device 38. This may be, for example, a keypad or a writing pad integral to a personal digital assistant in which the transmitter 12 is implemented. In still another version, the message entry device 38 includes one or more switches.

The system also achieves an energy efficient interrogation scheme because the transmitter 14 can be configured to consume a minimal amount of power. For example, in one embodiment involving optical signals, the total power drawn by the transmitter 14 is less than or equal to 60 milliamps. As a result, the transmitter 14 can be integrated into wireless handheld devices. In one version of this embodiment, noted above, the wireless handheld device is a personal digital assistant. In another version, the wireless handheld device is a cellular phone.

The signal processor 18 of the tag 10 includes a circuit (such as a passive filter) that isolates particular characteristics of the interrogation signal (such as its carrier frequency), as detected at the receiver 16, from background signals. The signal processor is designed to operate at very low power. When the interrogation signal is detected, a logic gate is asserted, which wakes up the microprocessor 20. The receiver 16 and signal processor 18 of the tag 10 cooperate to condition the object identification code in the received signal (e.g., by demodulation or discrimination). The microprocessor 20 then compares the stored tag identification with the object identification received with the interrogation signal 12. Upon detection of a match, the microprocessor 20 causes the transducer 28 to emit the observable signal 8. The observable signal 8 may be either audible, visible, or both. In one version, the transducer 28 comprises one or more light emitting diodes ("LEDs"). In a further version, the transducer 28 comprises a piezoelectric buzzer. A plurality of transducers 28 may be used to increase the amount of information conveyed by the tag 10 upon interrogation. For example, one observable signal 8 may be emitted when the tag 10 receives an object identification that matches the tag identification and a different observable signal 8 may be emitted when the tag 10 receives an object identification that does not match the tag identification.

In an alternate embodiment, the tag 10 may be employed to block an otherwise observable signal from view until the object identification matching the identification contained in the tag 10 is received. Upon receipt of the matching identification, the tag 10 allows the signal to be observed. In this case, the observable signal 8 may be emitted from a source external to the tag 10. For example, in one embodiment, the tag 10 may include a window that under ambient conditions is opaque, and therefore blocks a light source located behind the tag 10. However, the window becomes transparent when the object identification associated with the tagged item is received, thereby allowing the observable signal 8 to be seen. In one version of this embodiment, the window is a liquid crystal that can be toggled between an opaque state and a transparent state. This version is advantageous because the power consumption of the tag 10 is reduced as a result of the low power requirements of the liquid crystal.

Figure 2:
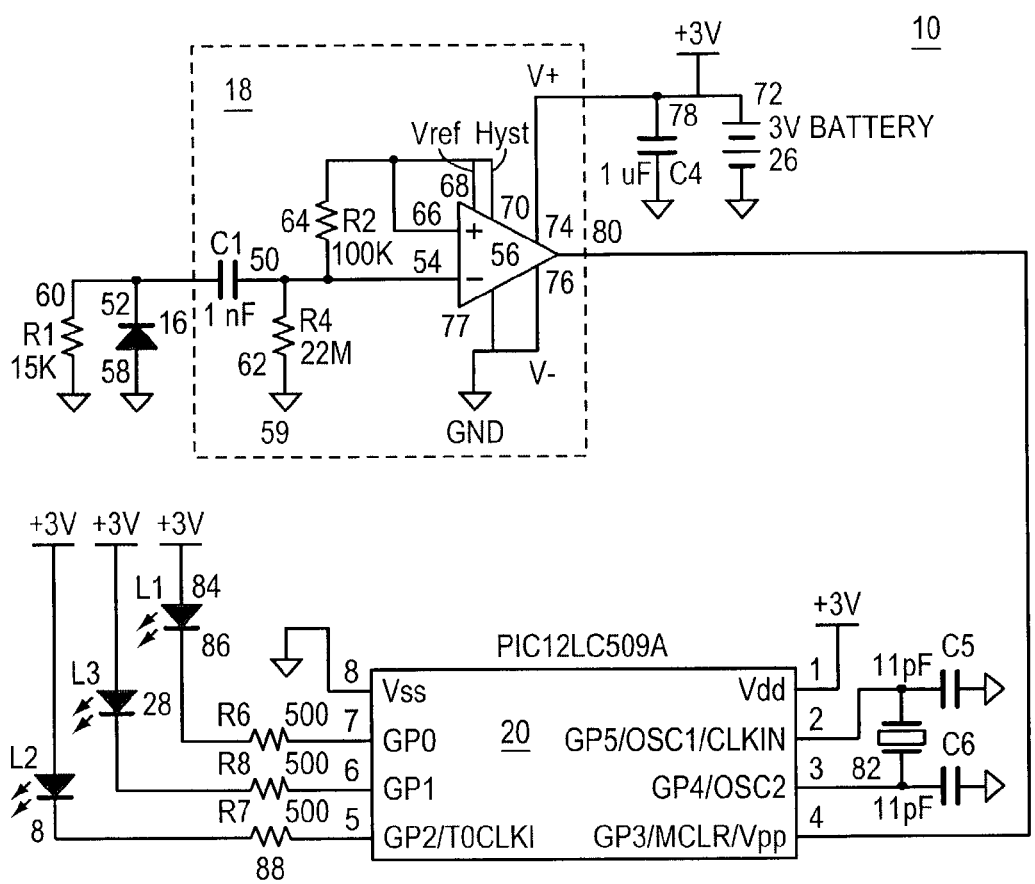
FIG. 2 is a schematic diagram of an identification tag in accordance with the invention.

Refer now to FIG. 2, which illustrates a suitable circuit for a tag 10 incorporated in an identification system utilizing pulse-coded optical interrogation signals. This approach is advantageous for at least two reasons. First, because the ambient optical environment is relatively free of optical signals with sharp edges, pulse-coded optical transmission achieves a relatively high signal-to-noise ratio. As a result, a linear amplifier is not required in the tag 10 circuitry, and a very low-power comparator 56 can be used to wake up the microprocessor 20 upon detection of these pulses. Second, an optical message provides a visible beam that indicates to the searcher the area that is being scanned with the interrogation signal 12.

The illustrated circuit comprises a microprocessor 20, transducers 28, a power supply 26, a receiver 16, and signal processing circuitry 18. In the embodiment shown, the receiver 16 is a photodiode and the power supply 26 is a battery, e.g., a lithium coin cell that produces a nominal operating voltage of three volts DC at a nominal capacity of 48 milliamp-hours. The detection and signal processing circuitry 18 includes a high pass filter capacitor 50 connected between the cathode 52 of the receiver 16 and the inverting input 54 of a comparator 56. The anode 58 of the receiver 16 is connected to ground 59, and a load resistor 60 is connected in parallel with the receiver 16. A 15 kΩ resistor 60 results in a large amplitude for the 2 kHz interrogation signal 12 so that the signal 12 is readily sensed by the comparator 56. A second resistor 62 is connected between the inverting input 54 of the comparator 56 and ground 59. Additionally, a third resistor 64 is connected between the inverting input 54 and non-inverting input 66 of the comparator 56. The non-inverting input 66 is also connected to both the comparator's 56 reference voltage input 68 and hysteresis input 70. The positive terminal 72 of the power supply 26 is connected to the positive supply voltage terminal 74 of comparator 56. Both the comparator's negative supply voltage terminal 76 and ground terminal 77 are connected to ground 59. The power supply 26 also provides power to the microprocessor 20 and transducers 28. A second capacitor 78 is connected in parallel with the power supply 26 to remove electrical noise from the output of power supply 26. The comparator output 80 is connected to the microprocessor 20. A crystal 82 is also connected to the microprocessor 20. The crystal 82 provides a clock signal used for timing. In one embodiment, the microprocessor 20 is clocked at 4 MHz and has a 1 MHz instruction cycle. In the embodiment shown, the transducers 28 are LEDs. The anode 84 of each transducer 28 is connected to the positive terminal 72 of the power supply 26, and the cathode 86 of each transducer 28 is connected to the microprocessor 20 through separate transducer resistors 88.

In one version of this embodiment, the values of the high pass filter capacitor 50 and the third resistor 64 are used to set the time constant of the input filter, and the values of the second resistor 62 and the third resistor 64 are used to set the triggering threshold on the received interrogation signal 12. The high pass filter prevents the tag 10 from processing optical signals other than those issuing from the transmitter 14, keeping the microprocessor, which by far dominates the power consumption of the tag electronics, in a very low-power sleep state until the carrier is detected. Thus, the tag 10 will not falsely detect signals generated by either natural light or artificial light, and will not falsely power the processing electronics under these conditions. In one embodiment, the filter time constant is chosen to be much greater than the total period of the interrogation message in order to pass the bits of the interrogation message intact.

In one version of the embodiment shown, the comparator 56 is a nano-power comparator that draws approximately 300 nanoamps when the identification tag 10 is not processing the interrogation signal 12. In this version, the comparator 56 provides a one volt reference which can source or sink up to one milliamp of current. In another version of this embodiment, the tag's power consumption is further reduced by utilizing a microprocessor 20 that operates on approximately 2.5 volts, and draws approximately 200 nanoamps when the microprocessor 20 is in sleep mode. In a further embodiment, the total power consumption of the identification tag 10 is less than or equal to 100 nanoamps when the tag 10 is not processing an interrogation signal 12.

Figure 3:
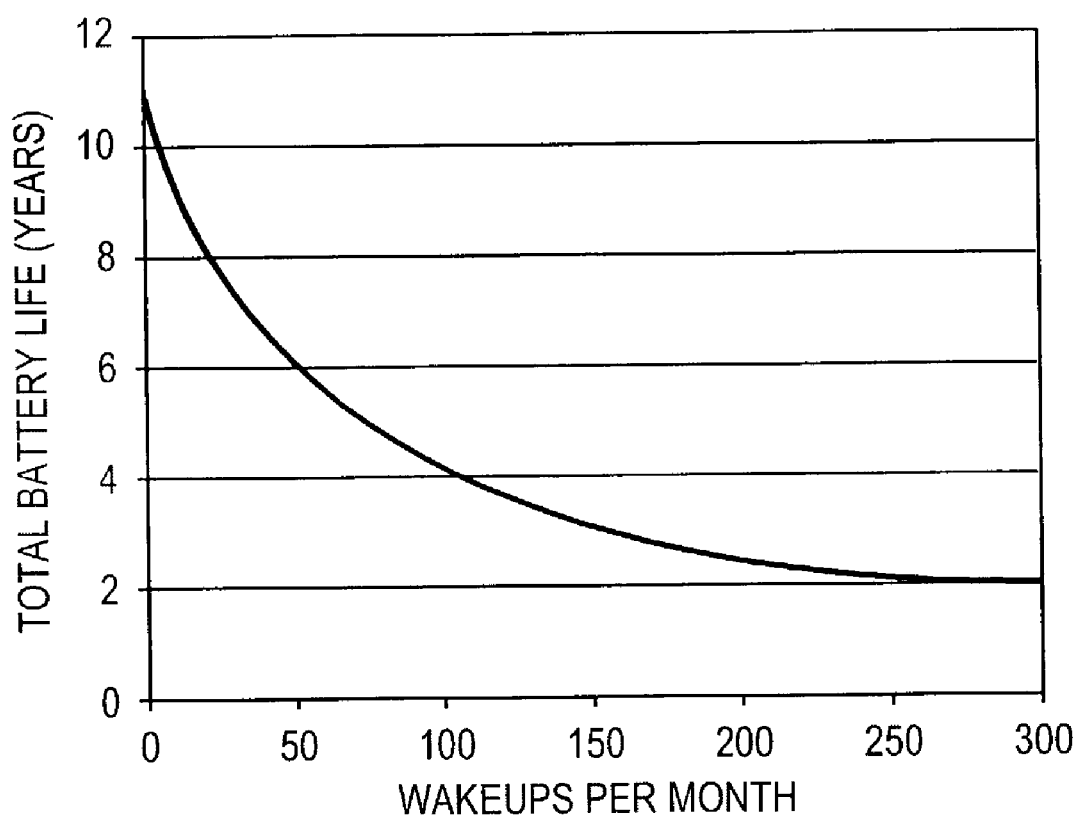
FIG. 3 is a graph of a photodetector signal and a comparator output in accordance with the invention.

As a result of these features, substantially passive operation of the identification tag 10 is achieved. FIG. 3 demonstrates the extended battery life that results therefrom. In this version, the battery life is approximately ten years—essentially the battery's shelf life. As can be seen from the graph, this capacity translates into a total battery life of approximately eight years when the identification tag 10 is interrogated twenty-five times a month. Thus, in many applications, the life of the tag 10 is greater than the useful life of the tagged item.

Figure 4:
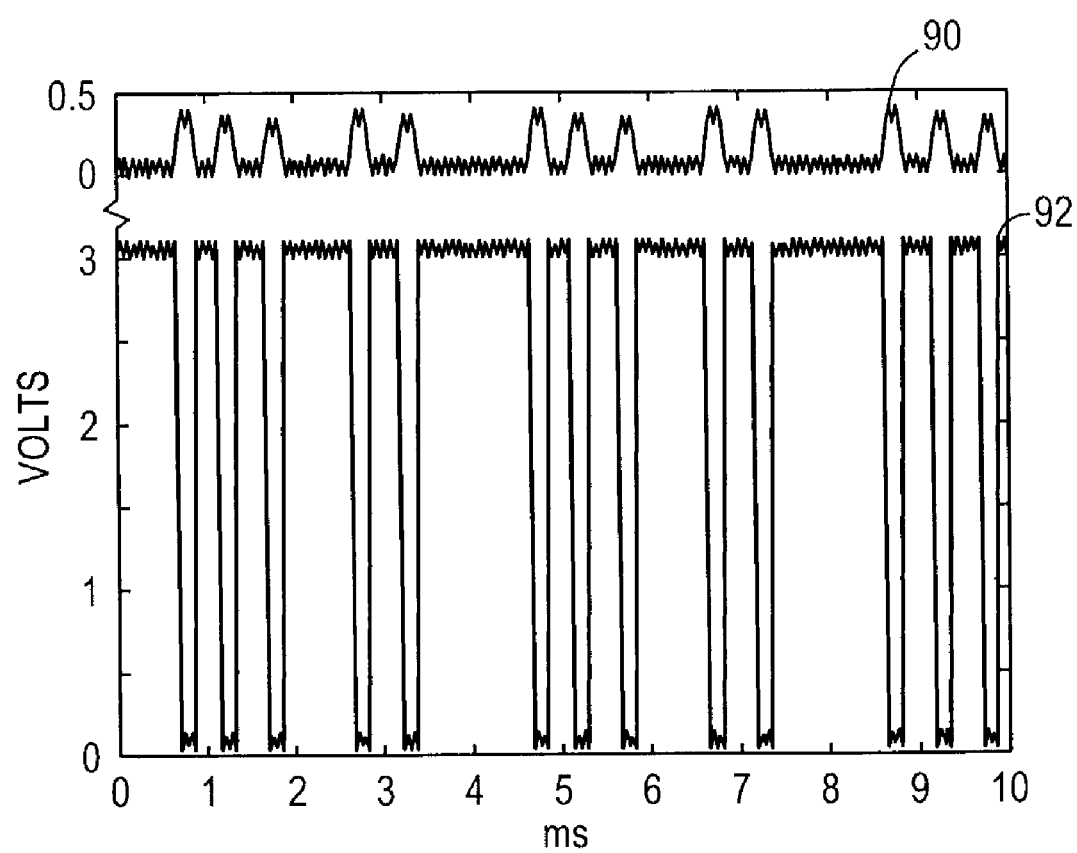
FIG. 4 is a graph of the life of an identification tag power source in accordance with the invention.

Because the photodiode is both insensitive to common dynamic light sources (e.g., fluorescent lights) and unaffected by ambient light levels, the identification tag 10 remains in the sleep mode until the interrogation signal 12 is received. When the comparator 56 receives the filtered output from the receiver 16, the tag 10 awakens and the microprocessor 20 begins to analyze the interrogation signal 12. The comparator output 80 supplies the coded message to the microprocessor 20. The microprocessor 20 hence wakes up when a carrier frequency is detected and begins to decode the message to determine the object identification contained therein. FIG. 4 depicts an example of a receiver output signal 90 and a comparator output signal 92. In one version of this embodiment, the microprocessor 20 employs a conventional serial decoding scheme to decode the message. The communication protocol may employ an on-off keying on half of the transmitted waveform. In one version of this embodiment, the microprocessor 20 is programmed to decode an eight-bit 2 kHz signal.

The identification tag 10 readily synchronizes to the transmission of a 2 kHz signal. In particular, the decoding program synchronizes with the signal by locating a signal transition from zero to one. Once the microprocessor 20 receives the quantity of bits required for a complete object identification, the microprocessor 20 determines if the decoded object identification matches the stored tag identification. Where the message is received serially, the microprocessor 20 rotates each newly-received bit through its buffer and determines the object identification for each new set of bits. In one version, an asynchronous communication protocol is employed. An eight-bit protocol results in thirty-six independent codes, and of these, thirty-five codes are usable because an all zero code is not detected. Further, in another version of this embodiment, a thirty-two bit protocol is employed to provide approximately 70 million independent codes. This approach may also be scaled-up to employ a sixty-four bit or larger protocol.

The system achieves a rapid response time. In one embodiment the microprocessor 20 will wake from the sleep mode approximately 18 milliseconds after receipt of the interrogation signal 12. Once the microprocessor 20 is fully operational, approximately four milliseconds are required to decode the message, thus bringing the total response time to approximately 22 milliseconds. A rapid response time is also achieved with either thirty-two bit or sixty-four bit protocols because only approximately 0.5 milliseconds of additional processing time is required per bit. These results can be further improved by increasing the data rate of the tag 10. In one embodiment, the microprocessor 20 responds by flashing a green, low-power LED if the transmitted object identification matches the tag identification, and a red LED if the object identification does not match the tag identification.

While the invention has been shown and described with reference to specific embodiments, it should be understood by those skilled in the art the various changes in form and detail may be made therein without departing from the spirit and scope of the invention.

What is claimed is:

1. A method of discriminating among similar items, the method comprising the steps of:
   a. associating each of the items with a device responsive to an optical signal encoding information specific to the item, wherein each of the devices responds to a differently modulated optical signal; and
   b. exposing the items to a modulated optical signal encoding information corresponding to a selected one of the items, the exposure causing the device associated with the item, but not the devices associated with other items, to cause impartation of an observable signal.

2. The method of claim 1 wherein the optical signal is modulated by an AM frequency, each of the devices responding to modulation by a different AM frequency.

3. The method of claim 1 wherein the observable signal is a light signal.

4. The method of claim 1 wherein, upon exposure to the optical signal, the device emits the observable signal.

5. The method of claim 1 wherein, upon exposure to the optical signal, the device causes the observable signal to be emitted by the selected item.

6. The method of claim 1 wherein the observable signal is emitted by an external source and is blocked from observation by all items except, upon exposure, the selected item.

7. The method of claim 1 wherein the observable signal is a directly observable signal.

8. A method of discriminating among similar items, the method comprising the steps of:
   a. associating each of the items with a device responsive to a signal encoding information specific to the item, wherein the device comprises a processor that is maintained in a low-power shutdown mode until the signal is detected; and
   b. exposing the items to a signal encoding information corresponding to a selected one of the items, the exposure causing the device associated with the item, but not the devices associated with other items, to cause impartation of an observable signal.

9. An identification system, the system comprising:
   a transmitter for transmitting at least one optical signal comprising an encoded identification associated with a selected tag, wherein each tag responds to a differently modulated optical signal;
   a plurality of tags each containing a tag identification uniquely identifying the tag, each tag being responsive to an optical signal whose encoded identification matches the tag identification; and
   associated with each of the tags, a transducer for imparting an observable signal upon response of the tag to the optical signal.

10. The identification system of claim 9 wherein the tag further comprises a transducer for emitting a different signal if the transmitted identification does not match the tag identification.

11. The identification system of claim 9 wherein the transmitter is integrated within a wireless handheld device.

12. The identification system of claim 11 wherein the handheld device is a personal digital assistant.

13. The identification system of claim 9 wherein the observable signal is directly observable in the vicinity of the tag.

14. The identification system as claimed in claim 9 wherein the transmitted identification is incorporated in a light beam by modulation thereof.

15. The identification system of claim 14 wherein the light beam is modulated by an AM frequency, each of the tags responding to modulation by a different AM frequency.

16. The identification system of claim 9 wherein the observable signal is a light signal.

17. The identification system of claim 9 wherein, upon exposure to the optical signal, the tag emits the observable signal.

18. The identification system of claim 9 wherein, upon exposure to the optical signal, the tag causes the observable signal to be emitted by an item.

19. The identification system of claim 18 wherein the item is an electronic storage medium.

20. The identification system of claim 9 wherein the tag comprises a power source that supplies an operating current for the tag.

21. The identification system of claim 20 wherein the tag operates in a sleep mode when not processing the optical signal.

22. The identification system of claim 21 wherein the power source supplies an operating current less than or equal to 500 nanoamps when the tag is in the sleep mode.

23. The identification system of claim 9 wherein the observable signal is audible.

24. The identification system of claim 9 wherein the observable signal is visible.

25. An identification system, the system comprising:
   a transmitter for transmitting at least one signal comprising an encoded identification associated with a selected tag;
   a plurality of tags each containing a tag identification uniquely identifying the tag, each tag being responsive to a signal whose encoded identification matches the tag identification and wherein the tags are maintained in a low-power shutdown mode until the signal is detected; and
   associated with each of the tags, a transducer for imparting an observable signal upon response of the tag to the signal.

26. An identification tag that identifies a unique object having a generic appearance, the tag comprising:
   a receiver for receiving a modulated optical signal encoding an object identification;
   a memory for storing a tag identification uniquely identifying the tag; and
   a device for emitting an observable signal in response to the optical signal when the received object identification matches the stored tag identification, wherein the object identification uniquely identifies the object from among a plurality of objects having a similar appearance.

27. The identification tag of claim 26 further comprising a power source that supplies an operating current for the tag.

28. The identification tag of claim 26 wherein the observable signal is audible.

29. The identification tag of claim 26 wherein the observable signal is visible.

30. An identification tag that identifies a unique object having a generic appearance, the tag comprising:

a receiver for receiving a signal encoding a unique object identification;

a memory for storing a tag identification uniquely identifying the tag;

a power source that supplies an operating current for the tag;

circuitry that causes the tag to operate in a sleep mode when not processing the signal; and a device for emitting an observable signal in response to the signal when the received object identification matches the stored tag identification, wherein the object identification uniquely identifies the object from among a plurality of objects having a similar appearance.

31. The identification tag of claim 30 wherein the power source supplies an operating current less than or equal to 500 nanoamps when the tag is in the sleep mode.

32. The identification tag of claim 26 wherein the tag is configured for integration within a media item, the memory receiving the tag identification when information is transferred to the media item.

33. The identification tag of claim 32 wherein the tag identification is read when data is transferred to the media item.

* * * * *